(12) United States Patent
Podemsky

(10) Patent No.: US 9,906,514 B1
(45) Date of Patent: Feb. 27, 2018

(54) RESISTING ANONYMOUS SCRAPING

(71) Applicant: LinkedIn Corporation, Mountain View, CA (US)

(72) Inventor: Yoav Podemsky, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 162 days.

(21) Appl. No.: 14/982,214

(22) Filed: Dec. 29, 2015

(51) Int. Cl.
  H04L 29/00 (2006.01)
  H04L 29/06 (2006.01)
  H04L 29/08 (2006.01)
  G06F 21/30 (2013.01)

(52) U.S. Cl.
  CPC .............. H04L 63/08 (2013.01); G06F 21/30 (2013.01); H04L 63/10 (2013.01); H04L 63/126 (2013.01); H04L 63/1441 (2013.01); H04L 67/141 (2013.01); H04L 63/0245 (2013.01)

(58) Field of Classification Search
  None
  See application file for complete search history.

(56) References Cited

U.S. PATENT DOCUMENTS

| | | | | |
|---|---|---|---|---|
| 6,938,170 B1 * | 8/2005 | Kraft | ................... | G06F 17/3089 707/999.005 |
| 8,762,705 B2 * | 6/2014 | He | ...................... | H04L 63/0428 713/150 |
| 9,420,049 B1 * | 8/2016 | Talmor | .................... | H04L 67/02 |
| 9,552,487 B2 * | 1/2017 | Vierra | .................... | G06F 21/604 |
| 2007/0011170 A1 * | 1/2007 | Hackworth | ......... | G06F 21/6263 |
| 2009/0282062 A1 * | 11/2009 | Husic | ...................... | G06F 21/62 |
| 2014/0019488 A1 * | 1/2014 | Wo | ...................... | G06F 21/6218 707/784 |
| 2016/0063660 A1 * | 3/2016 | Spector | ................ | G06T 1/0021 382/100 |

OTHER PUBLICATIONS

Wikipedia: "Web Scraping" Downloaded from en.wikipedia.org on Dec. 27, 2016. en.wikipedia.org/wiki/Web_scraping.

* cited by examiner

*Primary Examiner* — Madhuri Herzog
(74) *Attorney, Agent, or Firm* — Park, Vaughan, Fleming & Dowler LLP

(57) ABSTRACT

A system, method, and apparatus are provided for applying a technique for resisting or hindering scraping of a website or other repository of electronic data. When a connection from an entity is received at the website, if no signal or information is received that identifies the entity (e.g., a user identifier, a cookie), or the information is insufficient to discriminate the entity from other entities (e.g., an IP address that is or may be shared), one or more techniques are applied, such as: delaying loading of a page or page component, rendering a page (or page component) as an image, rendering only a portion of a page, applying a CAPTCHA, redirecting the entity to a login page, and/or others. Thus, an anti-scraping technique is activated for a connection from what could be a scraper that has purged its browser data of some or all identifying information.

20 Claims, 3 Drawing Sheets

RESISTING ANONYMOUS SCRAPING

BACKGROUND

This disclosure relates to the field of computers. More particularly, a system, method, and apparatus are provided for resisting the scraping of data from a website or other electronic data repository.

Many websites make information available to visitors without requiring them to login or otherwise verify or authenticate their identities. For example, even a website that requires a member or use to login in order to access some information may make other information available to anonymous and first-time visitors, as well as users who don't login. Such publicly available information may include directory pages, basic information about an organization associated with the website, public profiles of some or all members, etc.

In general, website scraping allows the scraper to quickly assemble large amounts of data (which may be proprietary) without much effort. Although in some cases scraping of a website may be relatively harmless, in other cases malicious actors may scrape a website or data repository to obtain information (e.g., names, electronic mail addresses, telephone numbers) that can be used for undesirable purposes (e.g., identity theft, spamming), and/or the scraping activity itself may interfere with normal (i.e., non-malicious) use of the website, because it consumes resources that were intended for legitimate use of the site, not scraping.

Sometimes it can be difficult to determine that a given user session is a scraping attempt, especially if the user/scraper masks its activity to avoid acting like an automated entity (e.g., a bot). For example, a website may capture an IP (Internet Protocol) address of an entity that scrapes the site, but because IP addresses can be spoofed and because multiple people may use a single address, a later connection from the same address may represent another scraping attempt or a legitimate user connection.

DETAILED DESCRIPTION

Figure 1:
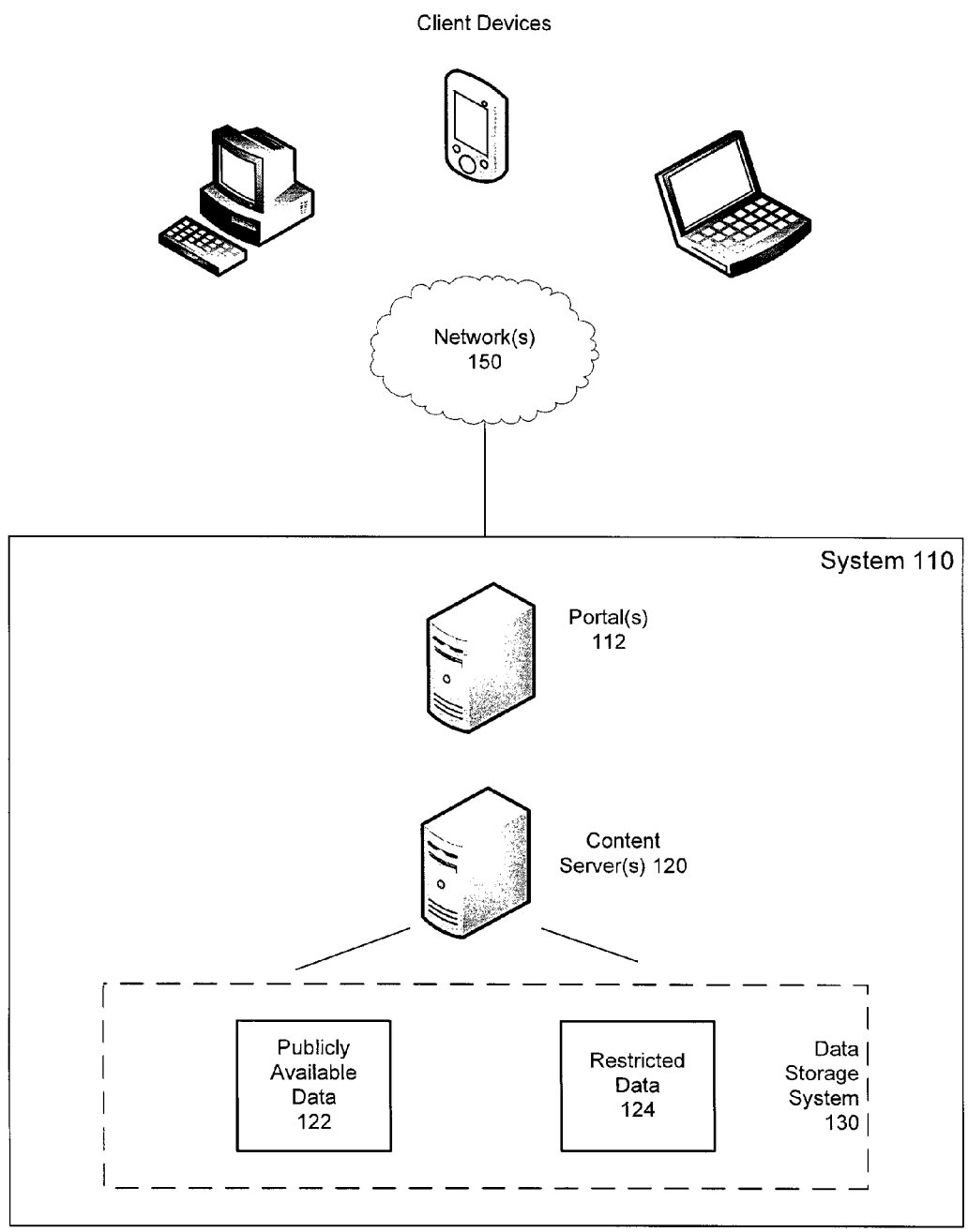
FIG. 1 is a block diagram depicting a computing environment in which a website may resist or hinder scraping activity, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for resisting or hindering the scraping of a website or other electronic repository. In these embodiments, techniques are provided for making the scraping more costly or expensive for the scraper in terms of time, effort, and/or other resources. The harder it is for the scraper to extract data from a given site (or repository), the less likely it is that the scraper will obtain all available data, and the more likely it is that the scraper will abort the scraping attempt and/or avoid further attempts at scraping the site. The specific technique or counter-action applied for a given attempt (or suspected) attempt to scrape a site may be selected by default, may depend on the nature of the attempt, and/or may depend on other factors.

In these embodiments, an anti-scraping technique may be selected and applied when a particular set of circumstances is detected. For example, if a user session is initiated without receipt of a cookie or other signal that can be used to identify or categorize the user (e.g., as a possible or likely scraper, as a known user), the user may be assumed to be a scraper that has purged identifying information from its browser (or from other software that establishes the user session). Therefore, an anti-scraping technique discussed herein (or some other technique) is applied whenever a user session is created without receipt of any signal that can be used to characterize the user. Illustrative signals are discussed below.

Note that a user that connects without providing any useful signal may be a legitimate first-time visitor to the site, but as described below, some techniques may be applied that are not likely to frustrate such visitors even though they may frustrate a scraper. Also, in some implementations, an anti-scraping technique may only be applied after the user has exhibited some suspicious behavior (e.g., accessing or retrieving data in a particular manner, ignoring offers to login the user or register the user as a new member of the site).

One anti-scraping technique or action that may be taken is to delay the loading of a page the user navigates to (or a component of a page). Illustratively, if a scraper's attempts to navigate a site continually, frequently, or regularly encounter delayed page loads (e.g., two seconds, five seconds), the scraper may become frustrated and abort the scraping attempt. Conversely, it is hoped that a valid new user will not object to a short delay. Delayed loading or rendering of information may begin with the initial (e.g., home) page, or a subsequent page, and may or may not be applied to every subsequent page. If the user logs in or provides other user credentials or authentication, the delayed loading may be terminated automatically.

A second anti-scraping technique may cause a requested page to be rendered and displayed as an image, even if the content is textual. By presenting textual content as an image, a scraper cannot directly extract the text content, and must perform some character recognition process (e.g., Optical Character Recognition or OCR) in order to obtain the text, which will slow the scraping process. The image may be overlaid with links that mimic or replicate links within the underlying textual content, so that the user (which may be a legitimate first-time user) can continue to navigate the content.

A third anti-scraping technique or action involves serving only a portion of a requested page (or page component), such as a portion of a list, a subset of results of a search operation, a subset of the components of the page, etc. The remaining content may be displayed in response to a particular user action (e.g., activation of a specific link or control rendered with or within the page). The same portion of a given page may be served every time the page is displayed in a partial manner, or the masked portion may change from one visit to another. In some implementations, a given component or portion of a page may be categorized as never being shown as part of this technique, as always being shown when this technique is applied, or as a candidate for being displayed (wherein one or more candidates are selected for display each time the page is to be presented).

A fourth anti-scraping technique may be applied to redirect the user/actor to a login screen. This may be applied each time the user/actor attempts to navigate to a page (and doesn't present any user credentials), may be applied when navigating to some pages but not others, or may be applied with some other strategy.

A fifth anti-scraping technique or action may involve a CAPTCHA, wherein the user/actor must enter textual input corresponding to an image presented to the user/actor in order to access a requested page or page component.

Different techniques cause different levels of friction or frustration. For example, a CAPTCHA or redirection to a login page may generate more friction than simply delaying a page load, presenting only partial content, or presenting textual content as an image. While it may be desirable to induce frustration in a scraper, the effect on a valid user who is visiting the website for the first time must also be considered. Therefore, the benefit obtained by resisting or hindering a scraper must be balanced against the possible irritation of a new user and, as a result, higher-friction techniques or actions may be avoided. If some other information is available that bolsters the suspicion that the user is a malicious actor (e.g., some other signal(s) received by the website from the user's device), then a higher-friction technique may be warranted.

FIG. 1 is a block diagram depicting a computing environment in which scraping attempts may be resisted or hindered, according to some embodiments.

System 110 of FIG. 1 is (or is part of) a data center that serves content to users, and thus may host or otherwise support one or more websites that serve web pages and/or other content to users. For example, the data center may host a network of users, such as a professional network offered by LinkedIn® Corporation, or may host some other service or application enjoyed by many users. Users of system 110 may be termed members because they may be required to register with the system in order to fully use features, applications, and/or services of system 110, and to access data that is not publicly available.

Users of system 110 and/or applications/services hosted by the system connect to the system via client devices, which may include stationary devices (e.g., desktop computer, workstation) and/or mobile devices (e.g., smart phone, tablet computer, laptop computer). In order to interact with the system (e.g., to navigate/view content, to submit or edit content) the client devices operate suitable client applications, such as a browser program or an application designed specifically to access system 110 (or an application/service offered by the system).

Client devices are coupled to system 110 via direct channels and/or one or more networks 150 or other shared channels, which may include the Internet, intranets, and/or other networks, and may incorporate wired and/or wireless communication links.

Interactive user/member sessions with system 110 are generally made through a portal 112, which may comprise a portal server, a web server, an application server, and/or some other gateway or entry point. The portal through which a given session is established may depend on the member's device and/or method of connection. For example, a user of a mobile client device may connect to system 110 via a different portal (or set of portals) than a user of a desktop or workstation computer.

System 110 also includes one or more content servers 120, and optional data storage system 130. Any component of system 110 may alternatively be implemented as or termed a service, a platform, or some other type of entity.

Content server 120 maintains or at least has access to one or more repositories of content items for serving to members, within an internal data storage system and/or data storage system 130, an index of the content items, and/or other information useful in serving content to members. Illustratively, a content server may serve on the order of hundreds of millions of content items or objects every day, via a corresponding number of user connections/sessions, any number of which may be attempts by scrapers to glean data from system 110.

In particular, system 110 serves both publicly available data 122 and restricted data 124. Illustratively, publicly available data 122 can be accessed (e.g., viewed) by virtually all visitors who successfully connect to system 110, regardless of whether or not they are registered users or members of the system. In contrast, restricted data 124 may only be accessible to registered users/members that login or otherwise verify their identities to system 110. Data 122 and data 124 may be served by the same content server(s) or by separate content servers.

Registered users of system 110 may have corresponding "identity" or "home" pages on the system (e.g., web pages, content pages), which they may use to facilitate their activities with the system and with each other, to view content, to form connections/relationships with other members, to view their connections and/or information regarding their connections, to review/modify profiles, to inform friends and/or colleagues of developments in their lives/careers, to send/receive communications, etc. These pages (or information provided to members via these pages), or portions of these pages (e.g., selected data from members' profiles) may be available to some or all other members and may or may not be included in publicly available data 122.

Optional data storage system 130, which may be a distributed data storage system, and/or components of the data storage system (e.g., separate storage engines), include appropriate data storage devices (e.g., disks, solid-state drives), and store data used by portal(s) 112, content server(s) 120, and/or other components of system 110 not depicted in FIG. 1.

In association with establishing communication sessions with users, and serving content to them, system 110 collects various signals from the users' devices, browsers (or other communication software), and/or the user's themselves. In some embodiments, these signals or representations of the signals (e.g., hashes or digests) are stored in data storage system 130 and/or elsewhere (e.g., portal(s) 112, content server(s) 120, a separate server). At least some content pages served to users (e.g., their identity or home pages) include code that, when executed by the users' browsers or other applications, cause their devices to return the desired signals. This code may also reside within data storage system 130, portal(s) 112, content server(s) 120, and/or elsewhere.

For the purpose of identifying a given user as a possible (or certain) scraper, portal(s) 112 and/or other components of system 110 are configured to examine the signals, identifiers, and/or other indicia received as part of the process of establishing a user connection or session. For example, a given portal 112 may operate web server software (e.g., Apache Tomcat™, Internet Information Services by Microsoft®, GlassFish® by Oracle America), which may be configured to determine whether a connection request (e.g., an HTTP request) includes a cookie (e.g., a session cookie, an authentication cookie, a browser cookie), a user identifier, a fingerprint, or some other signal that may be used to determine whether a new connection is from a legitimate user or a possible/likely/certain scraper.

In some embodiments, signals collected for the purpose of attempting to determine whether or not the user may be a scraper (or, in contrast, a valid user) include one or more of: a cookie (a session cookie, an authentication cookie, a browser cookie, an evercookie), a canvas fingerprint (e.g., a canvas fingerprint created with the HTML5 canvas element), user agent, screen resolution, screen size, plug-ins, time zone, cpu (e.g., type of central processing unit), accelerometer (e.g., whether the device has an accelerometer, type of accelerometer), software versions of one or more programs residing on the device (e.g., the browser, Java™, Adobe Flash™, the operating system), keyboard (e.g., existence of a keyboard, type of keyboard), microphone (e.g., existence of a microphone, type of microphone), camera (e.g., existence of a camera, type of camera), clock skew (e.g., if constant), fonts, page loading time (e.g., for a predetermined page), execution time of a calculation or operation (e.g., calculate some quantity of prime numbers), touch screen (e.g., existence of a touch screen, type of touch screen), multi-touch screen (e.g., existence of a multi-touch screen, type of multi-touch screen), cache storage (e.g., the type/amount of cache storage).

The signals may also (or instead) include signals that depend on or that involve user activity: a pattern of input device movements (e.g., on a mouse) made by a user when viewing some content or when clicking on a particular control within a web page; some characteristic of use of a keyboard (e.g., pattern of key clicks, (average) speed of key presses), such as when entering text into an input field of a web page; and whether the user has set a Do Not Track flag. Note that some of these signals can only be collected or determined after a user connection or session has been established.

Illustratively, if any of these signals are collected, they can be compared to signals previously received by the website during known (or assumed) scraping activity or, in contrast, during normal user activity. Based on correlation or lack of correlation, the user may be assumed to be a scraper or a valid new user, and an anti-scraping technique may or may not then be applied. U.S. patent application Ser. No. 14/807,669, filed Jul. 23, 2015 and entitled "Authenticating a Cookie with Distinctive Signals," describes the use of signals mentioned above for verifying the authenticity of a user credential (e.g., a cookie), which may help indicate whether a given user is a valid user or a scraper, and is hereby incorporated by reference.

As already discussed, however, the absence of some or all of these signals may itself be used as evidence that a connecting user is a scraper that has purged its browser of identifying signals, and cause an anti-scraping technique to be triggered.

System 110 may include other components not illustrated in FIG. 1. For example, the system may include one or more profile servers for maintaining profiles of users/members of the services and applications hosted by system 110; the profiles may be stored in data storage system 130 and/or elsewhere (e.g., a dedicated profile repository). An individual member's profile may include or reflect any number of attributes or characteristics of the member, including personal (e.g., gender, age or age range, interests, hobbies, member ID), professional (e.g., employment status, job title, job location, employer or associated organization, industry, functional area or role, skills, endorsements, professional awards, seniority), social (e.g., organizations the user is a member of, geographic area of residence, friends), educational (e.g., degree(s), university attended, other training), etc. A member's profile, or attributes or dimensions of a member's profile, may be used in various ways by system components (e.g., to identify or characterize the member, to characterize a member connection that involves the member, to characterize content with which the member interacts, to identify content topics/items that may interest the member, to select content to serve to the member, to record a content event). Some elements of a member profile may be included in publicly available data 122 (e.g., employer, education), while other elements are part of restricted data 124.

Organizations may also be members of the service(s) offered by system 110 (i.e., in addition to individuals), and may have associated descriptions or profiles comprising attributes such as industry, size, location, goal or purpose, etc. An organization may be a company, a corporation, a partnership, a firm, a government agency or entity, a not-for-profit entity, a group or collection of associated members, or some other entity formed for virtually any purpose (e.g., professional, social, educational). Either or both organizations and individual members may "follow" and/or be followed by other members, may share and/or received shared information, may initiate and receive communications with other members, may post content and/or receive content posted by other members, may form connections with other members, etc.

As another example, system 110 may include one or more tracking servers for monitoring and recording, within data storage system 130 and/or elsewhere (e.g., one or more tracking/activity repositories), activity of system 110 and/or users of the system. For example, whenever content is served by the system (e.g., to a client device operated by a user/member), the tracking server may be informed of that content that is served, to whom (e.g., which member), when it was served, and/or other information. Similarly, the tracking server may also record member actions regarding content, to include identities of the members and the content acted upon, the action that was taken, when the action was taken, how long the interaction lasted, follow-on activity (if any), whether a current set of signals received from a device match previously stored signals, etc.

Functionality attributed herein to system 110 may be distributed among its components in an alternative manner, such as by merging or further dividing functions of one or more components, or may be distributed among a different collection of components. Yet further, while depicted as separate and individual hardware components (e.g., computer servers) in FIG. 1, one or more of portal(s) 112 and content server(s) 120 may alternatively be implemented as separate software modules executing on one or more computer servers. Thus, although only a single instance of a particular component of system 110 may be illustrated in FIG. 1, it should be understood that multiple instances of some or all components may be utilized.

Figure 2:
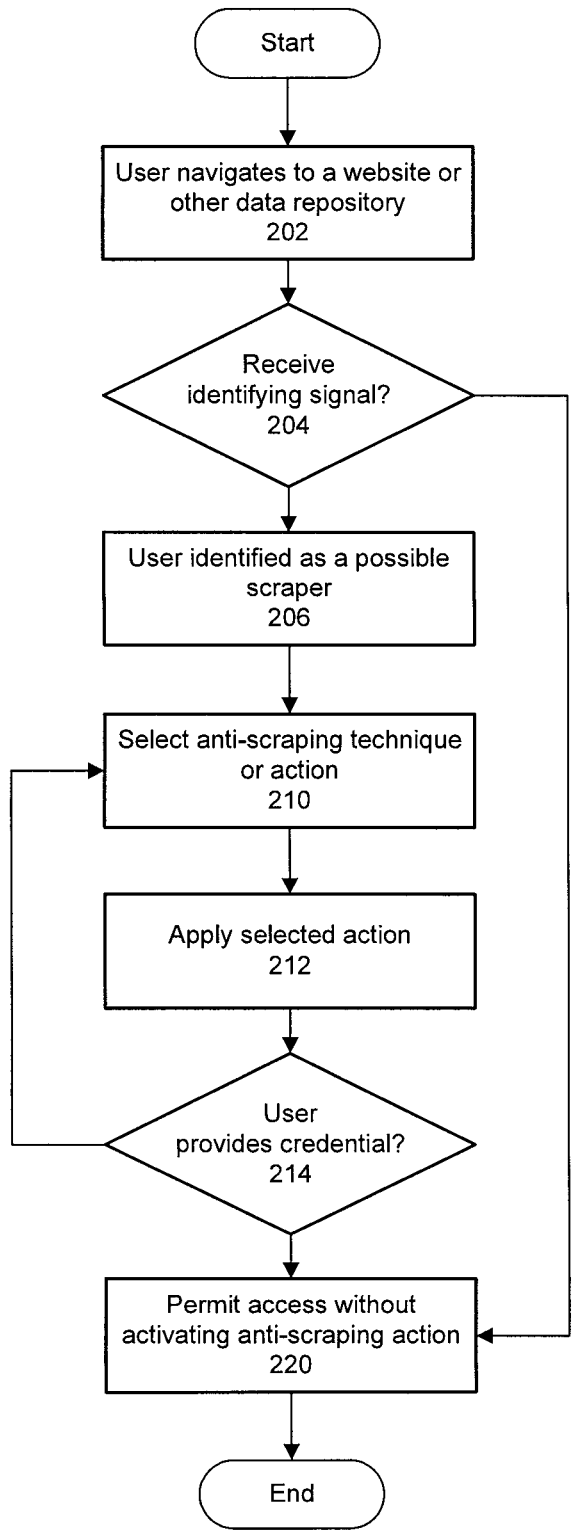
FIG. 2 is a flow chart illustrating a method of resisting or hindering scraping activity, in accordance with some embodiments.

FIG. 2 is a flow chart demonstrating a method of resisting or hindering a scraping attempt, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

In operation 202, a user or actor navigates a browser (or other comparable application) operating on his or her electronic device to access a website that is configured to apply anti-scraping techniques. In response to the connection request or attempt from the device, the website (e.g., a computer system that hosts or supports the website) establishes a communication connection with the device.

In operation 204, the website (e.g., a web server process) determines whether a cookie (e.g., a browser cookie, a session cookie) or other type of useful discriminating signal (e.g., user agent, canvas fingerprint) was received from the browser as part of establishing the communication connection. If a useful signal is received that indicates that the connecting entity is unlikely to be malicious, the method advances to operation 220; otherwise, the method continues at operation 206.

In operation 206, the user/actor appears to be a scraper that has purged its browser before initiating a scraping session, because the connection metadata is devoid of any indication to the contrary. Although the connecting entity may instead be a new user that has never (or at least not in recent history) visited the website, until/unless the user/actor indicates otherwise (e.g., by logging in, by registering and setting up an account), the website may continue to assume the connection is from a malicious actor.

In operation 210, the website (e.g., a web server, an application server) selects an anti-scraping or counter-scraping technique or action to apply, and in operation 212 the action is applied. In some implementations, a default action is preselected and applied for use in some or all circumstances (e.g., based on the website, time of day, day of the week, IP address of the user). In other implementations, an action may be selected dynamically, based on the circumstances and/or other factors (e.g., data provided by the user's browser that fell short of allowing the website to characterize the user/actor as legitimate).

In operation 214, a determination is made as to whether the user/actor has logged in, registered, or otherwise provided credentials or signals that indicate that it is a genuine user. If not, the method may return to operation 212 (or operation 210) as warranted by further action by the user/actor. For example, if the user/actor continues to navigate to additional publicly available pages, the same (or a different) anti-scraping technique or action may be applied. If the user/actor does provide a trustworthy credential or signal, the method advances to operation 220.

In operation 220, the user/actor is permitted access to requested data in a manner consistent with the confidence or trust granted to the proffered credential(s) or signal(s). Thus, if the user logs in with a valid username and password, all restrictions (e.g., all use of anti-scraping techniques/actions) may be halted.

In the method of FIG. 2, activity by a suspected scraper is resisted in a manner that hopefully frustrates the actor's attempts to quickly and easily extract data from the website. The anti-scraping technique or techniques that are applied may be chosen so as to avoid frustrating a legitimate new user/visitor. Depending on the signals that are received during the connection attempt (or after the session is established), the site may characterize the user/actor as malicious or genuine with a suitable confidence level, which may change as the user/actor navigates the site, and the anti-scraping techniques that are applied may reflect this confidence. Although several anti-scraping techniques or actions have been described, in other embodiments other actions may be applied.

As part of the normal course of establishing or hosting a communication connection with the user/actor (e.g., as part of operation 202 or a subsequent or separate operation), the website may deliver to the user/actor's device a cookie (or other token) configured to identify the user/actor (or the device) when a subsequent connection is attempted or requested. However, if the user/actor is indeed a scraper or other malicious actor who purged the device's browser data of identifying or discriminating signals, the token will not be delivered to the website when the subsequent connection is initiated. Therefore, the website again will not receive a useful identifying signal, and will again apply an anti-scraping technique. Thus, although the malicious actor may successfully prevent the website from realizing that this specific actor has returned to the site, the website can still resist or hinder the actor's activity.

Figure 3:
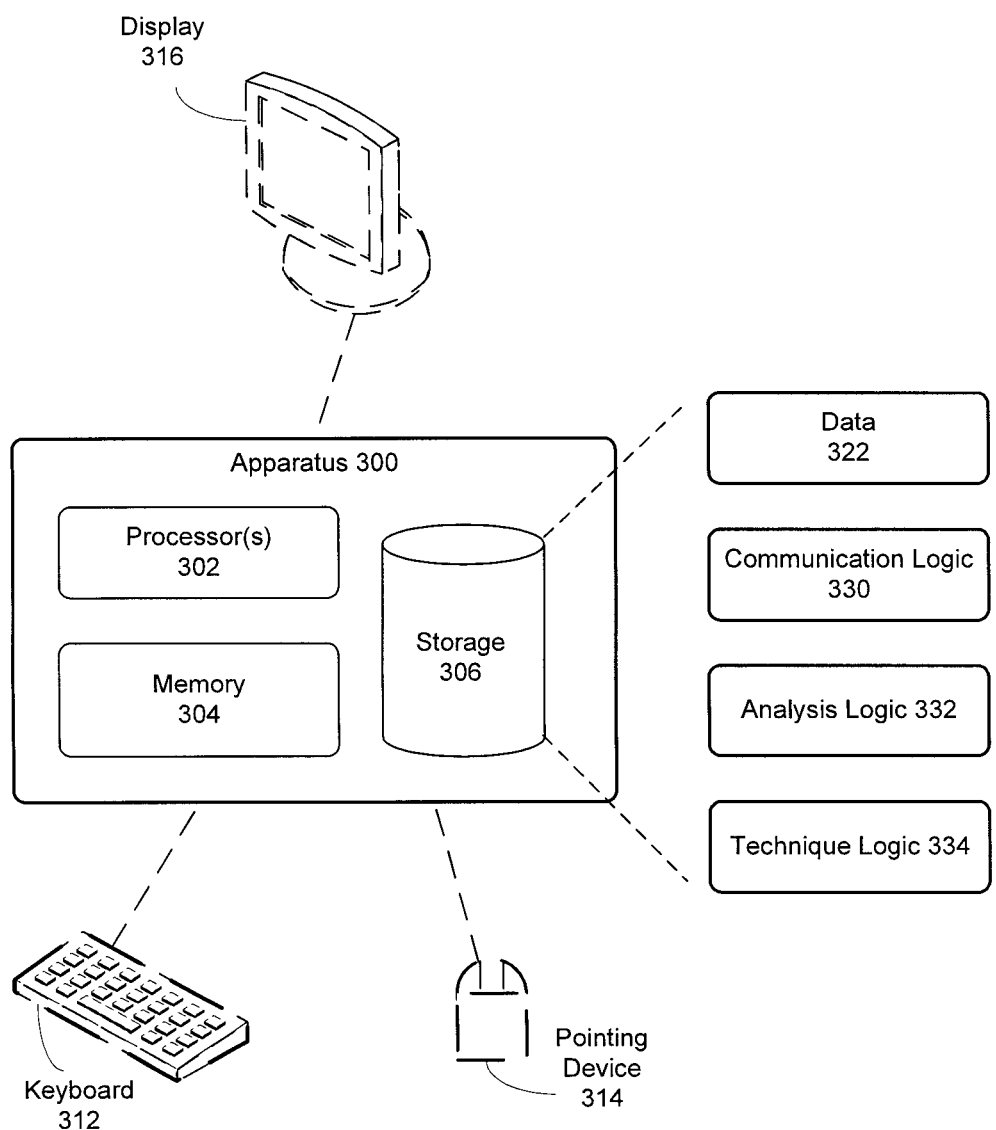
FIG. 3 depicts an apparatus for resisting or hindering web scraping, in accordance with some embodiments.

FIG. 3 is a block diagram of an apparatus for resisting or hindering scraping activity, according to some embodiments.

Apparatus 300 of FIG. 3 includes processor(s) 302, memory 304, and storage 306, which may comprise one or more optical, solid-state, and/or magnetic storage components. Storage 306 may be local to or remote from the apparatus. Apparatus 300 can be coupled (permanently or temporarily) to keyboard 312, pointing device 314, and/or display 316.

Storage 306 stores data 322, which may include distinctive or discriminating signals gathered from one or more client devices (and/or users of those devices), and/or representations of such signals (e.g., hashes, summaries, checksums). Cookies (or other identifiers) that were issued to the devices may also reside in storage 306, or may be stored elsewhere.

Storage 306 also stores logic and/or logic modules that may be loaded into memory 304 for execution by processor(s) 302, such as communication logic 330, analysis logic 332, and technique logic 334. In other embodiments, any or all of these logic modules may be aggregated or divided to combine or separate their functionality as desired or as appropriate.

Communication logic 330 comprises processor-executable instructions for establishing communication (e.g., user) sessions with client devices. As part of the process of establishing such sessions, logic 330 obtains discriminating signals (if any) provided by the client devices during creation of the sessions and/or during the sessions.

Analysis logic 332 comprises processor-executable instructions for determining whether signals collected by logic 330 allow a connected entity to be identified as a non-scraper. For example, if the entity logs in with a valid username and password, or if the entity provides a valid cookie, apparatus 300 may determine that the entity is a legitimate user and may not apply an anti-scraping technique. Conversely, analysis logic 332 (and/or communication logic 330) may determine that the connecting entity has not provided any signals, identifiers, or indicia that will prevent apparatus 300 from assuming the entity is a scraper (e.g., a scraper that purged its browser of identifying signals).

Technique logic 334 comprises processor-executable instructions for applying an anti-scraping technique when prompted by analysis logic 332 and/or communication logic 330. Illustratively, after analysis logic 332 determines that a connecting entity could be a scraper, technique logic 334 is activated to apply a suitable technique, which may be predetermined or dynamically selected by any component of apparatus 300.

In some embodiments, apparatus 300 performs some or all of the functions ascribed to one or more components of system 110 of FIG. 1, or is implemented within such a system in addition to one or more of the illustrated components. Also, in some embodiments, logic 332 and logic 334 are combined into a single logic module.

An environment in which one or more embodiments described above are executed may incorporate a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method comprising:
at a computer system supporting a website, establishing a first communication connection with a client device;
determining that, during establishment of the first communication connection, no signal was received that identifies the client device or a user of the client device;
responsive to determining that no signal was received that identifies the client device or a user of the client device, transmitting to the client device, during the first communication connection, a token configured to identify the client device or a user of the client device, wherein the token is configured to be returned to the computer system when a subsequent communication is established between the client device and the computer system;
at the computer system, after termination of the first communication connection, establishing a second communication connection with the client device;
determining that the token was not received from the client device during establishment of the second communication connection; and
responsive to determining that the token was not received during establishment of the second communication connection, activating one or more techniques that enable resisting scraping of the website.

2. The method of claim 1, wherein:
the token is a cookie; and
the token, if received during establishment of the second communication connection, is a signal that identifies the client device or the user of the client device.

3. The method of claim 1, wherein each of the following is a signal that identifies the client device or the user of the client device:
the token;
an identifier of the user assigned by the website;
a cookie issued to the client device by the website; and
a fingerprint of the client device.

4. The method of claim 1, wherein techniques for resisting scraping of the website include:
causing loading of a page of the website on the client device to be delayed;
causing a page of the website that comprises text to be rendered on the client device as an image; and
causing the client device to render only a portion of a page of the website instead of an entirety of the page.

5. The method of claim 4, wherein techniques for resisting scraping of the website further include:
a CAPTCHA; and
redirecting the client device to a login page.

6. An apparatus, comprising:
one or more processors; and
memory storing instructions that, when executed by the one or more processors, cause the apparatus to:
at a computer system supporting a website, establish a first communication connection with a client device;
determine that, during establishment of the first communication connection, no signal was received that identifies the client device or a user of the client device;
responsive to determining that no signal was received that identifies the client device or a user of the client device, transmit to the client device, during the first communication connection, a token configured to identify the client device or a user of the client device, wherein the token is configured to be returned to the computer system when a subsequent communication is established between the client device and the computer system;
at the computer system, after termination of the first communication connection, establish a second communication connection with the client device;
determine that the token was not received from the client device during establishment of the second communication connection; and
responsive to determining that the token was not received during establishment of the second communication connection, activate one or more techniques that enable resisting scraping of the website.

7. The apparatus of claim 6, wherein:
the token is a cookie; and
the token, if received during establishment of the second communication connection, is a signal that identifies the client device or the user of the client device.

8. The apparatus of claim 6, wherein each of the following is a signal that identifies the client device or the user of the client device:
the token;
an identifier of the user assigned by the website;
a cookie issued to the client device by the website; and
a fingerprint of the client device.

9. The apparatus of claim 6, wherein techniques for resisting scraping of the website include:
causing loading of a page of the website on the client device to be delayed;
causing a page of the website that comprises text to be rendered on the client device as an image; and
causing the client device to render only a portion of a page of the website instead of an entirety of the page.

10. The apparatus of claim 9, wherein techniques for resisting scraping of the website further include:
a CAPTCHA; and
redirecting the client device to a login page.

11. A system, comprising:
one or more processors;
a communication module comprising a non-transitory computer-readable medium storing instructions that, when executed, cause the system to:
establish a first communication connection with a client device, wherein the system supports a website; and
after termination of the first communication connection, establish a second communication connection with the client device; and
an anti-scraping module comprising a non-transitory computer-readable medium storing instructions that, when executed, cause the system to:
determine that, during establishment of the first communication connection, no signal was received that identifies the client device or a user of the client device;
responsive to determining that no signal was received that identifies the client device or a user of the client device, transmit to the client device, during the first communication connection, a token configured to identify the client device or a user of the client device, wherein the token is configured to be returned to the computer system when a subsequent communication is established between the client device and the computer system;
determine that the token was not received from the client device during establishment of the second communication connection; and
responsive to determining that the token was not received during establishment of the second communication connection, activate one or more techniques that enable resisting scraping of the website.

12. The system of claim 11, wherein:
the token is a cookie; and
the token, if received during establishment of the second communication connection, is a signal that identifies the client device or the user of the client device.

13. The system of claim 11, wherein each of the following is a signal that identifies the client device or the user of the client device:
the token;
an identifier of the user assigned by the website;
a cookie issued to the client device by the website; and
a fingerprint of the client device.

14. The system of claim 11, wherein techniques for resisting scraping of the website include:
causing loading of a page of the website on the client device to be delayed;
causing a page of the website that comprises text to be rendered on the client device as an image; and
causing the client device to render only a portion of a page of the website instead of an entirety of the page.

15. The system of claim 14, wherein techniques for resisting scraping of the website further include:
a CAPTCHA; and
redirecting the client device to a login page.

16. The method of claim 1, wherein techniques for resisting scraping of the website include:
requesting the user of the client device to login or register; and
when the user of the client device fails to login or register as requested, performing one or more of:
causing loading of a page of the website on the client device to be delayed;
causing a page of the website that comprises text to be rendered on the client device as an image; and
causing the client device to render only a portion of a page of the website instead of an entirety of the page.

17. The method of claim 16, wherein causing the client device to render only a portion of a page of the website instead of an entirety of the page comprises:
causing the same portion of the page of the website to be rendered each time only a portion of a page of the website is rendered instead of an entirety of the page.

18. The apparatus of claim 6, wherein techniques for resisting scraping of the website include:
requesting the user of the client device to login or register; and
when the user of the client device fails to login or register as requested, performing one or more of:
causing loading of a page of the website on the client device to be delayed;
causing a page of the website that comprises text to be rendered on the client device as an image; and
causing the client device to render only a portion of a page of the website instead of an entirety of the page.

19. The apparatus of claim 18, wherein causing the client device to render only a portion of a page of the website instead of an entirety of the page comprises:
causing the same portion of the page of the website to be rendered each time only a portion of a page of the website is rendered instead of an entirety of the page.

20. The system of claim 11, wherein techniques for resisting scraping of the website include:
requesting the user of the client device to login or register; and
when the user of the client device fails to login or register as requested, performing one or more of:
causing loading of a page of the website on the client device to be delayed;
causing a page of the website that comprises text to be rendered on the client device as an image; and
causing the client device to render only a portion of a page of the website instead of an entirety of the page.

* * * * *